(12) United States Patent
Throckmorton

(10) Patent No.: US 8,176,734 B2
(45) Date of Patent: May 15, 2012

(54) HYDROSTATIC TRANSMISSION HAVING PROPORTIONAL PRESSURE VARIABLE DISPLACEMENT PUMP FOR LOOP CHARGE AND FAN FLOW SUPPLY

(75) Inventor: Charles D. Throckmorton, Ames, IA (US)

(73) Assignee: Sauer-Danfoss Inc., Ames, IA (US)

( * ) Notice: Subject to any disclaimer, the term of this patent is extended or adjusted under 35 U.S.C. 154(b) by 448 days.

(21) Appl. No.: 12/327,046

(22) Filed: Dec. 3, 2008

(65) Prior Publication Data

US 2010/0132352 A1 Jun. 3, 2010

(51) Int. Cl.
*F16D 31/02* (2006.01)
(52) U.S. Cl. .................. 60/452; 60/456; 60/488
(58) Field of Classification Search .............. 60/450, 60/452, 456, 488
See application file for complete search history.

(56) References Cited

U.S. PATENT DOCUMENTS

| | | | | |
|---|---|---|---|---|
| 4,446,697 A | * | 5/1984 | Goscenski, Jr. | 60/452 |
| 6,314,729 B1 | * | 11/2001 | Crull et al. | 60/456 |
| 6,931,847 B1 | | 8/2005 | Throckmorton et al. | |

OTHER PUBLICATIONS

"Cartridge valves provides drop-in flexibility." Hydraulics & Pneumatics Apr. 1, 2001: Career and Technical Education, ProQuest. Web. Sep. 23, 2011.*

* cited by examiner

*Primary Examiner* — Michael Leslie
(74) *Attorney, Agent, or Firm* — Zarley Law Firm, P.L.C.

(57) ABSTRACT

A hydrostatic transmission having a hydraulic pump that is fluidly connected to a hydraulic motor. The transmission also has a pressure control valve that has first and second stages and is fluidly connected to the hydraulic pump. By utilizing the pressure control valve when the first stage of the pressure control is at a minimum pressure the second stage determines the minimum charge pressure setting for the hydrostatic transmission.

3 Claims, 3 Drawing Sheets

HYDROSTATIC TRANSMISSION HAVING PROPORTIONAL PRESSURE VARIABLE DISPLACEMENT PUMP FOR LOOP CHARGE AND FAN FLOW SUPPLY

BACKGROUND OF THE INVENTION

This invention relates to hydrostatic transmissions. More specifically this invention relates to a hydrostatic transmission that utilizes a proportional pressure variable displacement hydraulic pump for both loop charge and fan flow supply.

Current hydrostatic transmissions combine supply flow and make-up flow from a single charge pump. In these circuits, a fixed displacement charge pump provides flow to the hydraulic motor that powers the cooling fan. The return oil leaving the hydraulic motor is then routed to the charge flow supply port of the hydrostatic transmission.

The supply port is connected to a "charge relief valve" which limits the charge supply pressure and limits the back pressure on the hydraulic fan motor. The speed of the hydraulic motor is regulated by controlling the by-pass pressure across the motor by the use of the relief valve that is plumbed in a parallel arrangement with the hydraulic motor. The relief valve may be either a fixed or a proportional pressure setting.

When a fixed pressure setting is used, the fixed pressure setting limits the maximum speed of the hydraulic fan motor. Alternatively when a proportional pressure setting is provided the proportional pressure setting allows the hydraulic fan motor speed to be controlled, or limited to meet the requirements of the cooling system.

Pending global emissions regulations have increased the need to minimize parasitic losses in vehicles and systems that use hydrostatic transmissions for propel and work functions. One method of reducing parasitic losses in these vehicles is to replace the fixed displacement charge pumps with variable displacement pumps. This is especially true when these pumps are used to supply flow to make up the charge flow requirements of the system and to drive the system's hydraulic cooling fans.

Typically, the pressure required to drive the cooling fan is several times the requirement of the "charge" circuit. Therefore present hydrostatic transmissions commonly by-pass fluid around the fan motor to regulate the delta pressure across the motor and/or regulate the speed of the fan motor. Consequently, any additional flow that is by-passed across a pressure regulating device, or relief valve, only contributes to increased parasitic losses and/or heat that must be removed from the system.

Therefore a principal object of the present invention is to provide a hydrostatic transmission that minimizes parasitic losses.

Yet another object of the present invention is to provide a hydrostatic transmission that minimizes the heat that must be removed from the transmission.

These and other objects, features, and advantages of the present invention will be discussed in the specification and claims.

SUMMARY OF THE INVENTION

The hydrostatic transmission has a hydraulic pump that is fluidly connected to a hydraulic motor that operates a fan. A The hydrostatic transmission also has a pressure control valve that has first and second stages and is fluidly connected to the hydraulic pump. When the first stage of the pressure control is at a minimum pressure the second stage of the pressure control valve determines the minimum charge pressure setting for the hydrostatic transmission.

DETAILED DESCRIPTION OF A PREFERRED EMBODIMENT OF THE INVENTION

Figure 1:
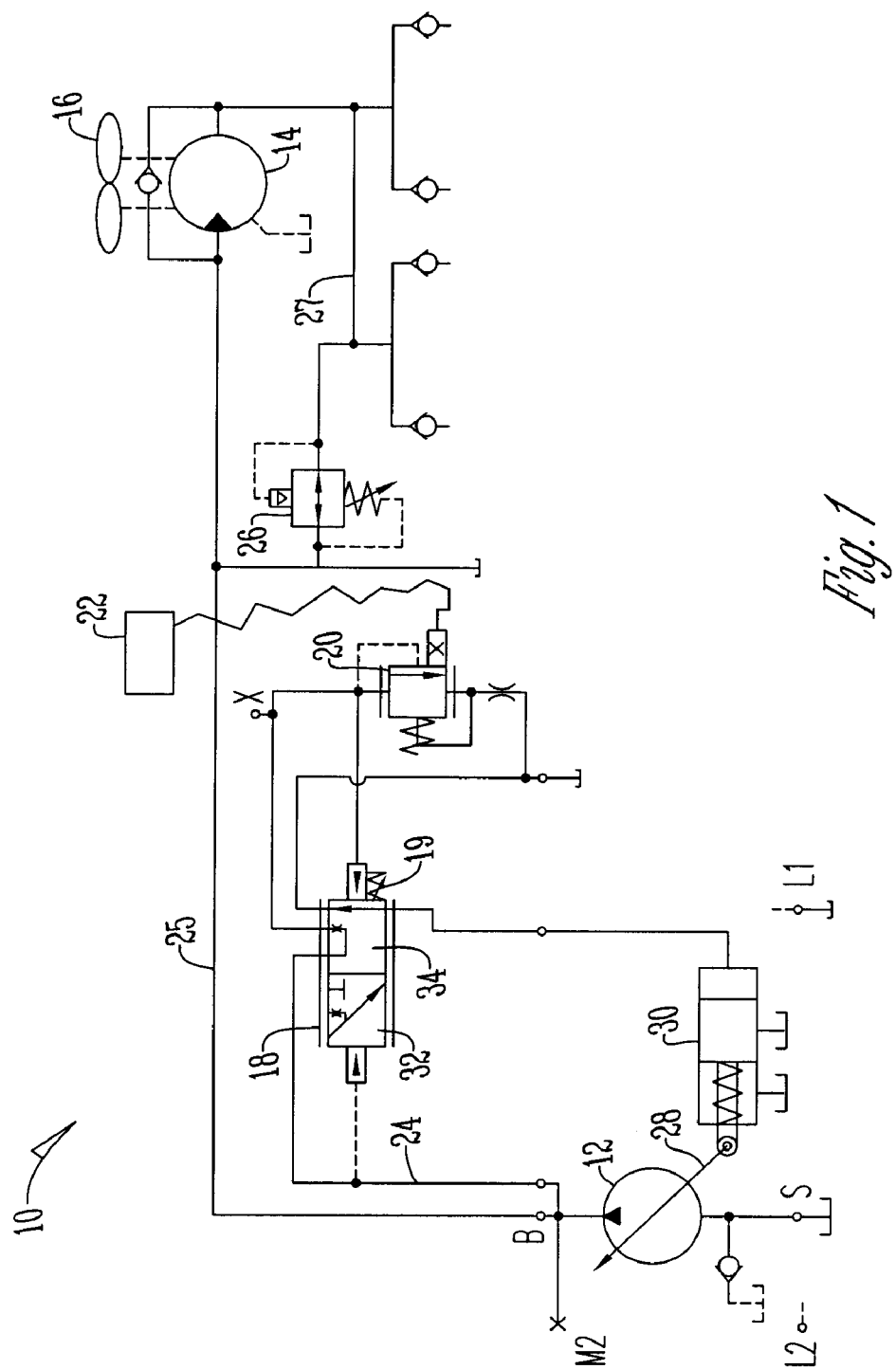
FIG. 1 is a schematic diagram of a hydrostatic transmission.
Figure 2:
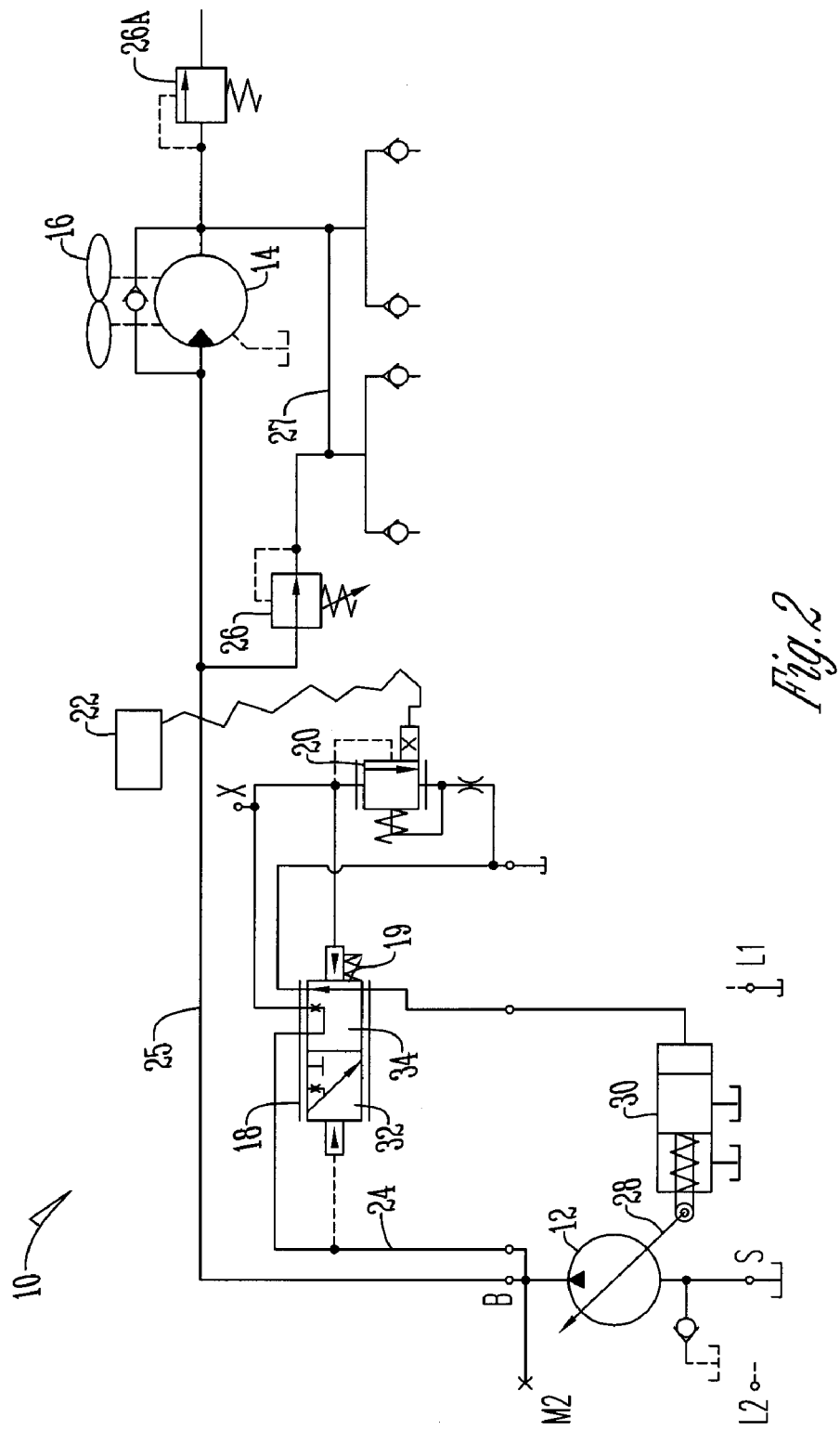
FIG. 2 is a schematic diagram of a hydrostatic transmission.
Figure 3:
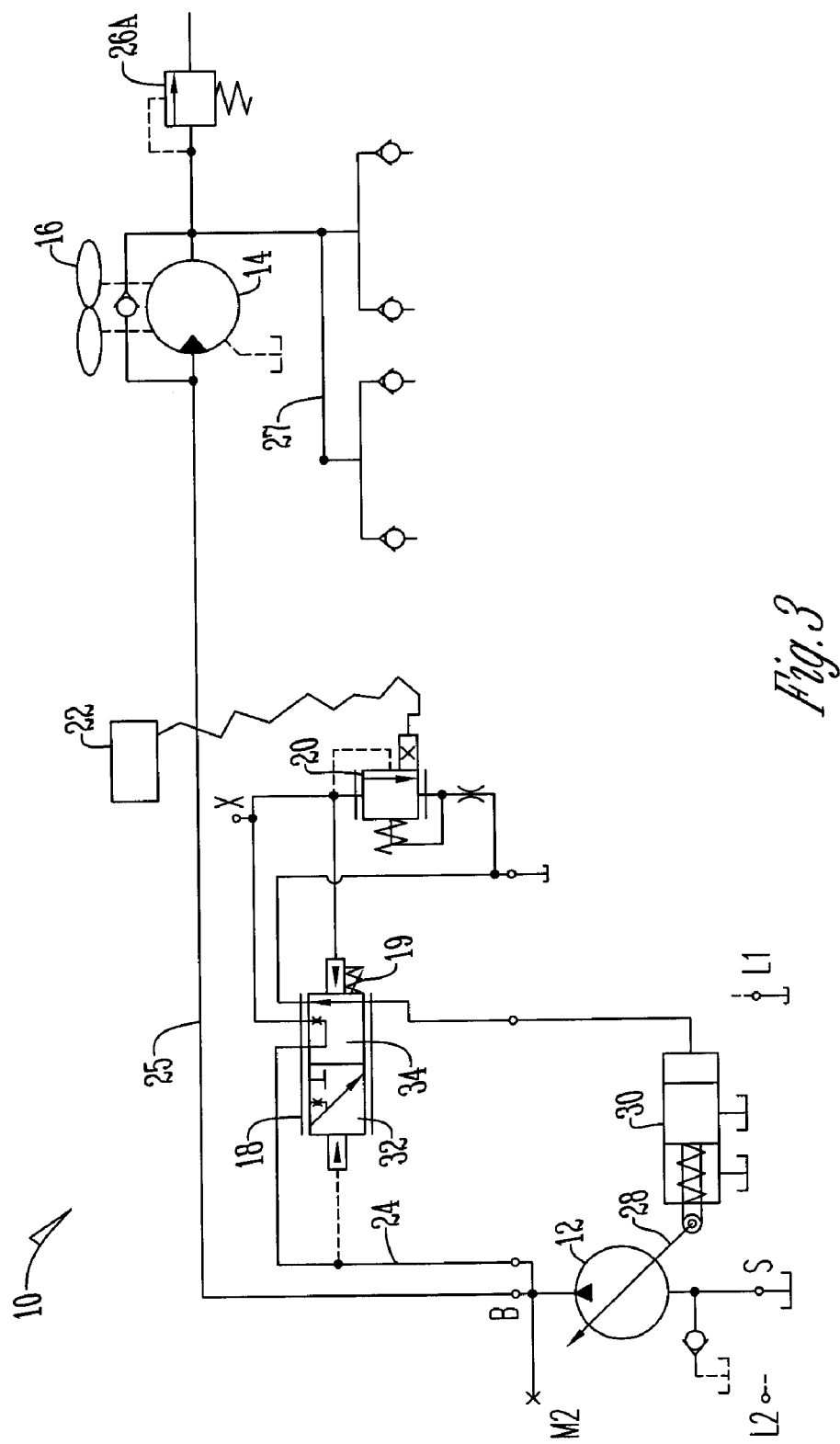
FIG. 3 is a schematic diagram of a hydrostatic transmission.

The figures show variations of a hydrostatic transmission 10. The hydrostatic transmission 10 has a hydraulic pump 12 that is fluidly connected to a hydraulic motor 14 that operates a fan 16. Also fluidly connected to the hydraulic pump 12 is a pressure control valve 18 that is also fluidly connected to a cartridge valve 20 that operates to control the hydraulic pump 12. Cartridge valve 20 is electrically connected and controlled by fan drive controller 22. The hydraulic pump 12, pressure control valve 18 and cartridge valve 20 are all fluidly connected to one another to form a pump displacement control circuit 24. Hydraulic pump 12 communicates through a combination pressure reducing/relief valve 26, and/or fan drive motor 14 to the hydrostatic transmission charge circuit 27. Optionally within this circuit as seen in the separate figures is an auxiliary combination pressure reducing/relief valve 26A.

Hydraulic pump 12 in a preferred embodiment is a variable displacement hydraulic pump. In this preferred embodiment the hydraulic pump 12 has a swashplate 28 that is actuated by a piston 30 that is fluidly connected to the pressure control valve 18. In this manner the pressure control valve 18 is able to control the displacement of the hydraulic pump 12.

In a preferred embodiment the pressure control valve 18 and cartridge valve 20 together function as a proportional pilot valve. The pressure control valve 18 has a first stage 32 and second stage 34 that control the displacement and actuation of hydraulic pump 12. Specifically when the cartridge valve 20 functions as a pilot valve of the pressure control 18 at a minimum pressure, the first stage 32 determines the minimum charge pressure setting for the hydrostatic transmission 10. The control current applied to pilot valve 20 determines the pilot pressure in the spring chamber 19 of pressure control 18. Pressure control 18 modulates between first stage 32 and second stage 34 to regulate the pressure to servo piston 30. First stage 32 of pressure control 18 causes the hydraulic pump 12 to move toward minimum displacement and second stage 34 causes hydraulic pump 12 to move toward maximum displacement. Consequently, the outlet pressure of hydraulic pump 12 in charge supply passage 25 is determined by the pilot pressure in the spring chamber 19 of pressure control 18. In this manner the first and second stage elements 32 and 34 are able to work together to satisfy both charge pressure requirements of the hydrostatic transmission 10 and the variable flow needs of the hydraulic cooling fan 16.

The cartridge valve 20 is sized to minimize the pressure drop in the control circuit when the hydraulic pump 12 is applying the nominal flow requirements for leakage, control supply and loop flushing. The cartridge valve also receives input from the fan drive controller 22 to determine optimum operation.

In operation when the hydraulic cooling fan 16 does not need to be actuated the pressure control valve 18 is at a minimum pressure and consequently the pressure setting of the second stage 34 determines the minimum charge pressure setting for the hydrostatic transmission 10. In this condition, the combined pressure reducing/relieving cartridge valve 20 remains in its maximum open condition. By remaining in a maximum open condition the cartridge valve 20 minimizes the pressure loss between the hydraulic pump 12 and the charge circuit 27 of the hydrostatic transmission system. The cartridge valve 20 is thus sized to minimize the pressure drop in the circuit 24 when the pump 12 is supplying the nominal flow requirements for leakage, control supply and loop flushing. Consequently, the cooling fan 16 does not rotate or alternatively it only rotates at a minimum speed until the fan 16 is commanded to turn as a result of increasing the pilot pressure using the pilot valve 20 and the second stage 34 of the pressure control valve 18.

When one desires to actuate the cooling fan 16 the pressure control valve 18 is commanded to increase the output pressure delivered by the hydraulic pump 12. The additional pressure at the outlet of the pump 12 is prevented from entering the charge circuit 27 by the combination pressure reducing/relief valve 26. This also limits the output pressure of the hydraulic motor 14. As a result the delta pressure across the hydraulic motor 14 is regulated by a proportional command to the pressure control valve 18 of the hydraulic pump 12. Therefore there is a direct relationship between the delta pressure across the hydraulic motor 14 and the speed of the motor 14. Consequently, the speed of the cooling fan 16 is directly controlled by the proportional signal to the pilot valve 20 via the pressure control valve 18 of the hydraulic pump 12.

As long as the flow through the fan motor 14 is less than the flow required by the charge circuit 27 of the hydrostatic transmission 10 some of the required charge flow passes through the pressure reducing/relieving cartridge valve 26 and the remaining portion flows through the hydraulic motor 14. When the flow through the hydraulic motor 14 exceeds the flow required by the charge circuit 27, the function of the cartridge valve 26 changes to vent the excess flow away from the charge circuit 27. Consequently, the flow leaving the hydraulic pump 12 and its output pressure is determined by the maximum requirement of each circuit independently without contributing to wasted power that goes to heating of hydraulic fluid.

In general, displacement of the hydraulic pump 12 is determined to insure that there is sufficient flow to fulfill the maximum "charge" flow requirements of the hydrostatic transmission 10 when a prime mover or engine is at minimum speed. Once the hydraulic pump 12 displacement and the pressure of the outlet of the hydraulic pump 12 have been determined this determines the amount of power that is required by the pump 12 during operation of machine. With a fixed displacement charge pump, when the engine speed increases there is a surplus of charge flow available and consequently the power to provide the charge flow of the hydrostatic transmission 10 increases proportionally with engine speed. The surplus power goes to heating the oil in the hydrostatic transmission system.

In part the hydrostatic transmission 10 allows the flow delivered by the pump 12 to vary to meet the instantaneous flow requirements of the system. Thus the hydrostatic transmission 10 allows the flow delivered by the hydraulic pump 12 to vary to meet the combined instantaneous flow requirements of the charge circuit 27, hydraulic accessories and/or the variable speed cooling fan 16.

Thus provided is a hydrostatic transmission that provides flow to meet the combined needs of the hydrostatic transmission charge circuit 27 and a proportional hydraulic fan motor 14 without increasing excessive parasitic power losses and contributing to excessive heating of the hydraulic fluid in order to regulate the speed of the hydraulic fan motor 14. Additionally the hydrostatic transmission uses a single pressure reducing/relieving cartridge valve 26 to limit/regulate the pressure in the charge circuit 27 and the outlet pressure on the hydraulic motor 14. Alternatively a separate pressure reducing cartridge valve 26A could be used to limit the supply of flow from the pump 12 and other separate pressure limiting relief valve to limit the pressure in the charge circuit 27 and the outlet of the hydraulic motor 14.

The hydrostatic transmission 10 also uses a two stage pressure control valve 18 in association with a variable displacement charge pump 12 to satisfy the flow/pressure needs of the charge circuit 27 when there is no need to command the fan 16 to turn. At the same time the pressure control valve 18 allows complete and independent, proportional control of the fan speed when needed. This combines the function of these two circuit requirements and allows supply of the flow from one pump while insuring that the displacement of the pump 12 can be minimized.

The hydrostatic transmission 10 also uses a two stage pressure control valve 18 in a variable displacement charge pump 12 in combination with the pressure reducing/relieving cartridge 26 allowing independent adjustment of the charge pressure to the hydrostatic transmission 10 without changing the command signal requirements for the regulation of speed of the proportional fan 16. A final advantage is realized in that the pressure gallery between the pump control 18 and pilot valve 20 are connected to other portions of the hydraulic circuit to allow a single pump 12 to provide flow to other accessories in a "load sensing" circuit upon demand. Consequently at the very least all the stated objectives have been met.

It will be appreciated by those skilled in the art that other various modifications could be made to the device without the parting from the spirit and scope of this invention. All such modifications and changes fall within the scope of the claims and are intended to be covered thereby.

What is claimed is:

1. A hydrostatic transmission comprising;
    a hydraulic pump that moves between a minimum displacement and a maximum displacement fluidly connected to a hydraulic motor that operates a fan;
    a control circuit including a cartridge valve fluidly connected to a pressure control valve having first and second stages and fluidly connected to the hydraulic pump;
    wherein the pressure control valve modulates between the first stage that causes the hydraulic pump to move toward minimum displacement and the second stage that causes the hydraulic pump to move toward maximum displacement;
    wherein a pilot pressure applied by the cartridge valve to a spring chamber of the pressure control valve determines the modulation of the pressure control valve between the first and second stages and an outlet pressure of the hydraulic pump; and
    wherein the hydraulic pump communicates through a hydrostatic transmission charge circuit to the hydraulic motor.

2. The hydrostatic transmission of claim 1 wherein a change in pressure across the hydraulic motor is regulated by a proportional command to the pressure control valve.

3. The hydrostatic transmission of claim 1 wherein the hydrostatic pump is a variable displacement hydraulic pump.

* * * * *